United States Patent [19]

Sugino et al.

[11] Patent Number: 4,787,013
[45] Date of Patent: Nov. 22, 1988

[54] INTERMEDIATE RANGE INTENSITY MODIFICATION OF GAUSSIAN BEAM USING OPTICAL INTEGRATION MEANS

[75] Inventors: Paul S. Sugino, Santa Maria; Leland V. Gardner, Buellton, both of Calif.

[73] Assignee: Santa Barbara Research Center, Goleta, Calif.

[21] Appl. No.: 126,434

[22] Filed: Nov. 30, 1987

[51] Int. Cl.⁴ .............................................. F21V 8/00
[52] U.S. Cl. ...................................... 362/32; 362/235; 362/259; 362/268; 362/339; 350/96.18
[58] Field of Search ................ 362/32, 235, 268, 236, 362/244, 246, 339, 26, 27, 326, 259; 350/96.15, 96.18, 96.28

[56] References Cited

U.S. PATENT DOCUMENTS

| | | |
|---|---|---|
| 2,146,905 | 2/1939 | McCleod et al. ................... 362/268 |
| 3,535,507 | 10/1970 | Sugino ................................ 362/235 |
| 3,669,524 | 6/1972 | Shio .................................... 362/32 |
| 4,439,022 | 3/1984 | Gebhardt et al. .................... 362/32 |
| 4,476,519 | 10/1984 | Hayamizu ........................... 362/259 |
| 4,619,508 | 10/1986 | Shibuya et al. ..................... 362/268 |
| 4,656,562 | 4/1987 | Sugino ................................ 362/235 |
| 4,726,641 | 2/1988 | Mori ................................... 362/32 |

FOREIGN PATENT DOCUMENTS 2830061 1/1980 Fed. Rep. of Germany ...... 362/259

Primary Examiner—Ira S. Lazarus
Assistant Examiner—Sue Hagarman
Attorney, Agent, or Firm—W. C. Schubert; V. G. Laslo; A. W. Karambelas

[57] ABSTRACT

An optical projection apparatus is disclosed for generating a planar light beam of substantially uniform intensity from a nonplanar multi-element light source 10 projecting a beam having a generally Gaussian intensity distribution. Light from the source 10 passes through an optical integrator rod 52 having a faceted entrance face 54 and a spherical exit face 50. The spherical exit face 50 is designed to move the image 42 of the rod entrance face that would otherwise be created between the objective lens 14 and output plane 40 to a position 48 between the lens 14 and the exit face 50. In such manner, localized hot spots which may be created by the image 42 of the entrance face are substantially eliminated thereby ensuring that the entire length of the beam between the lens 14 and output plane 40 has a substantially uniform intensity distribution.

11 Claims, 2 Drawing Sheets

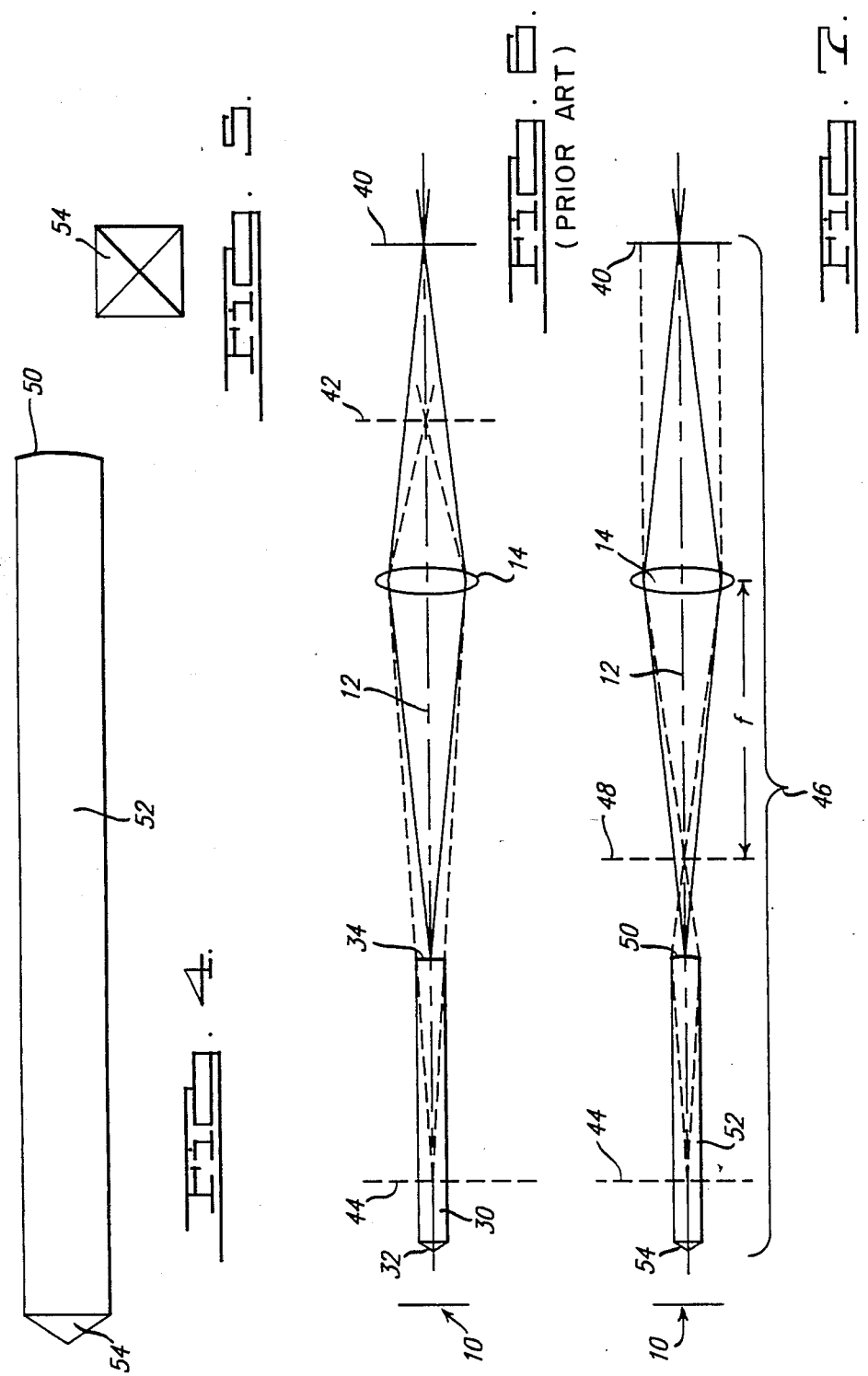

ated with the nonuniform light intensity distribution of laser beams (see, e.g. P. W. Rhodes et al., "Refractive Optical Systems for Irradiance Redistribution of Collimated Radiation: Their Design and Analysis", *Applied Optics*, Vol. 19, No. 20, Oct. 15, 1980).

INTERMEDIATE RANGE INTENSITY MODIFICATION OF GAUSSIAN BEAM USING OPTICAL INTEGRATION MEANS

BACKGROUND OF THE INVENTION

1. Technical Field

This invention relates to optical projection apparatus and, more particularly, to means for generating a light beam of substantially uniform intensity from a multi-element light source initially projecting a beam having a generally Gaussian intensity distribution.

2. Discussion

A laser is a source of high intensity, coherent, monochromatic light that has a number of diverse applications. The laser beam is often generated from a nonplanar array of discrete, mutually spaced light sources such as commonly found in GaAs laser diode arrays. In most applications it is desirable to convert the light from the nonplanar multi-element source into a substantially uniform flat or planar luminous source. U.S. Pat. No. 3,535,507 to Sugino discloses one particularly advantageous method of accomplishing this objective. Briefly, this is accomplished by passing the light through an axially elongated optical duct comprising a body of optical material with totally reflecting side faces, as well as flat entrance and exit faces perpendicular to the optical axis. The body of optical material effectively integrates or homogenizes the discrete nonplanar light sources into a uniform planar beam.

While the above-mentioned patent teaches an advantageous method of generating a planar beam from a plurality of discrete nonplanar sources, the output beam still does not have a uniform distribution of light intensity across its diameter. The technical literature reports several problems that are associated with the nonuniform light intensity distribution of laser beams (see, e.g. P. W. Rhodes et al., "Refractive Optical Systems for Irradiance Redistribution of Collimated Radiation: Their Design and Analysis", *Applied Optics*, Vol. 19, No. 20, Oct. 15, 1980).

The intensity of a laser beam generally follows a Gaussian distribution, i.e., the beam is more intense along its central optical axis. The high central irradiation is a potential eye hazard when using high powered lasers unless suitable precautions are taken. Still other problems associated with the Gaussian distribution is that it dramatically reduces the optical efficiency in optics such as telescopes with central obscuration.

In an attempt to redistribute the radiation of laser beams, the authors of the above-noted article disclose the use of aspheric refractive elements to normalize the output of the beam to a uniform energy distribution. Some of the drawbacks with this approach include the requirement for at least two additional lenses in the optical system thereby increasing costs, setup time, and other problems that are appreciated by the skilled practitioner.

One particularly advantageous approach to solving this problem is disclosed in U.S. Pat. No. 4,656,562 to Sugino which is assigned to the assignee of the present invention. There, a rod of optically transmitting material with a faceted entrance face is used to integrate or homogenize the light from the discrete, multi-element light sources and effectively invert the cross sectional intensity of the beam entering the entrance face to provide the beam with a more generally uniform intensity as it leaves the exit face. As will appear, the invention of this patent can be even further improved to ensure that there are no localized areas of concentrated energy or "hot spots" as the beam travels through the optical system from the exit face of the rod to the desired output plane.

SUMMARY OF THE INVENTION

According to the preferred embodiment of the present invention, an optical system is disclosed for generating a planar light beam from a multi-element source and projecting it with a substantially uniform intensity along the system axis through at least one objective lens to an output plane. A rod of optically-transmitting material is disposed downstream from the multi-element source and serves to integrate or homogenize the light from the multi-element source. The rod has a faceted entrance face that serves to redistribute light rays from the high intensity central area of the entering beam towards the outer circumference of the exit face of the rod. It has been discovered that the lenses in the optical system can unfortunately image the faceted end of the rod at a location between the objective lens and the output plane. This can cause localized hot spots in the beam which is to be avoided. In order to solve this problem, means are provided for moving the image of the entrance face upstream so that it is located between the exit face of the rod and the lens. Preferably, this is accomplished by providing the exit face of the rod with a spherical surface of sufficient radius to reform the image of the faceted rod entrance face at the front focal length of the lens.

BRIEF DESCRIPTION OF THE DRAWINGS

The various advantages of the present invention will become apparent to one skilled in the art upon reading the following specification and by reference to the drawings in which:

FIG. 4 is a side view of an integrator rod made in accordance with the teachings of the present invention;

FIG. 5 is an end view of the faceted entrance face of the rod;

FIG. 6 is an optical ray diagram illustrating how localized hot spots can possibly occur at certain locations in the optical system disclosed in the aforementioned U.S. Pat. No. 4,656,562; and FIG. 7 is an optical ray diagram of the optical system of the present invention.

Figures 1, 2, 3:
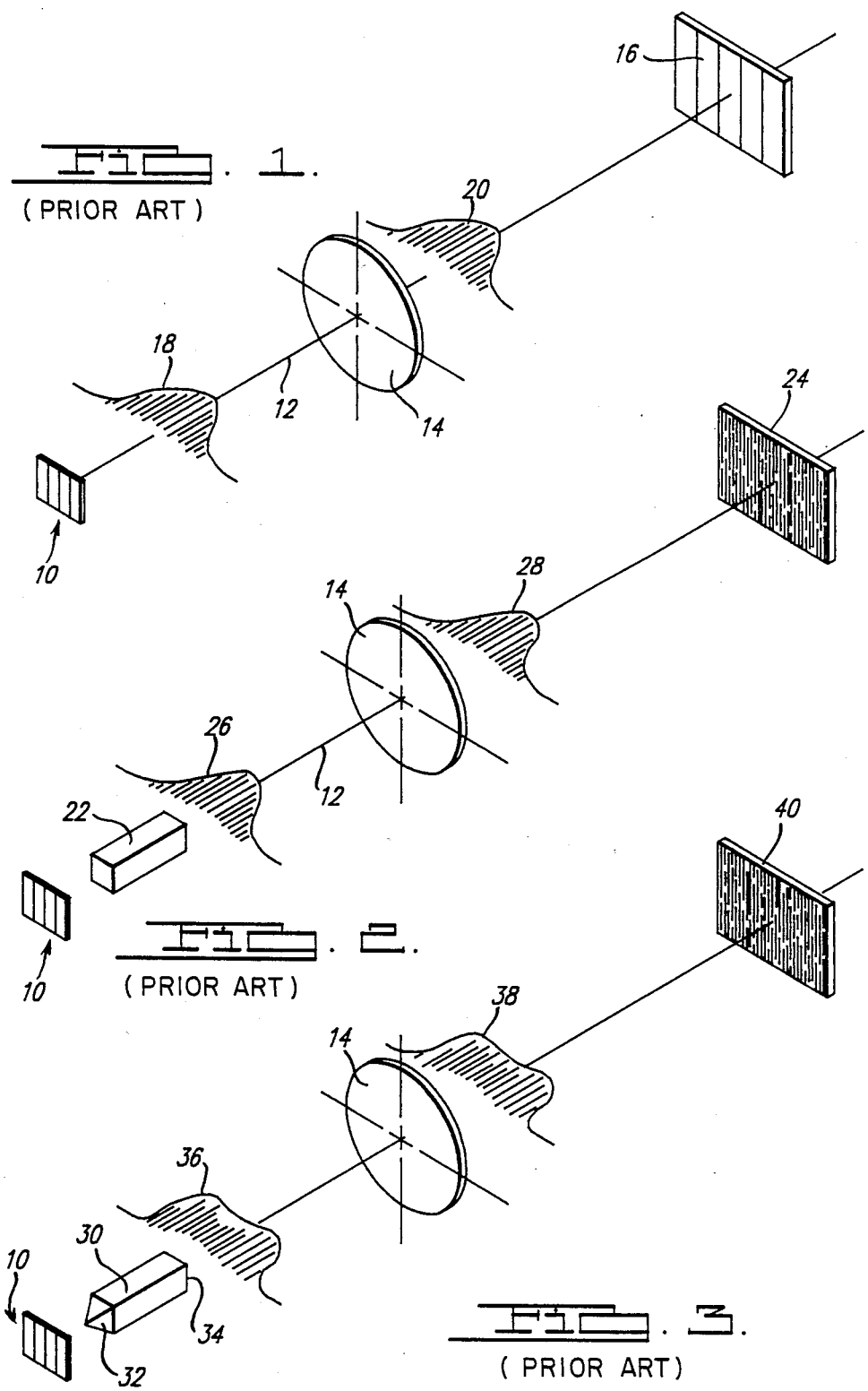
FIG. 1 is a pictorial view showing a first prior art optical system.
FIG. 2 is a pictorial view showing a second prior art optical system where the beam from the source has been optically integrated to provide a planar output beam.
FIG. 3 is a pictorial view of the optical system of the aforementioned U.S. Pat. No. 4,656,562 to Sugino for which the present invention is an improvement.

DESCRIPTION OF THE PRIOR ART AND THE PREFERRED EMBODIMENT OF THE PRESENT INVENTION

The contribution to the art provided by way of the present invention can be most easily appreciated by a reference to FIGS. 1, 2, 3 and 6 which schematically illustrate other optical systems. The present invention is particularly concerned with the modification of beams of light generated from a multi-element light source generally designated by the numeral 10. Source 10 is typically comprised of a multi-diode array in which the individual diodes are packaged in either a planar or nonplanar configuration. Multi-diode sources are well known in the art and are typically used for generating high powered laser beams. One example of a typical light source is the multi-diode array disclosed in the above-mentioned U.S. Pat. Nos. 3,535,507 and 4,656,562 to Sugino which are hereby incorporated by reference. For ease of illustration, the lines shown on source 10 in the drawings represent the light radiated from the individual elements, e.g., the individual diodes in the array.

The source 10 projects a beam along an optical axis 12 through a suitable lens subsystem including an objective lens 14 where the beam is projected onto a target or output plane 16. As illustrated in FIG. 1, the projection of the raw source 10 unfortunately tends to lead to a target illumination which is nonuniform, i.e., where each individual diode of the source is imaged at the target plane in the case of a planar source. If the source 10 is a nonplanar source, i.e., three dimensional, the target illumination also suffers from the defocus effects due to nonplanarity of the individual or discrete light sources making up the array. The intensity distribution of the projected beam at various points along the optical axis 12 is pictorially illustrated by energy profile curves 18 and 20. The light sources to which the invention pertains, such as laser diodes and arrays, have a high degree of coherency leading to a somewhat Gaussian distribution of intensity. In other words, the beam intensity is highly concentrated in the middle of the beam, with the intensity decreasing dramatically as one progresses towards the outer periphery of the beam as illustrated by profile 18 in FIG. 1.

In order to solve the far field target illumination problem noted above, the U.S. Pat. No. 3,535,507 to Sugino suggests the use of an integrator rod 22 as shown in FIG. 2. Briefly, the integrator rod 22 serves to homogenize the light from the individual elements of source 10 and convert the discrete light sources into an essentially uniform, planar source for illuminating output plane 24. Consequently, a target located at output plane 24 is illuminated uniformly thereby reaping the known advantages of such illumination. Unfortunately, the integrator rod 22 does not affect the intensity distribution of the beam along the optical axis 12. In other words, the intensity distribution represented by energy profile curves 26 and 28 in FIG. 2 are substantially the same as that of energy profile curves 18 and 20 of FIG. 1.

The system disclosed in the U.S. Pat. No. 4,565,562 to Sugino (FIG. 3) enables the user to obtain the advantages of the integrating function of the prior art integrator rod while at the same time going a long way to eliminating the intensity distribution problem. Briefly, the rod 30 is provided with a faceted entrance face 32 and a flat exit face 34. The faceted entrance face 32 serves to effectively invert the beam to thereby spread out the intensity distribution of the beam so it is no longer concentrated in the central area. This is illustrated by the energy profile curves 36 and 38.

Turning now to FIG. 6, it has been discovered that the objective lens 14 tends to form an image of the faceted entrance face 32 somewhere between the lens 14 and the output plane 40. In FIG. 6 the magnified image of the entrance face 32 is represented by plane 42. The displaced image of the entrance face 32 is illustrated at plane 44 within the rod 30. Since the entrance face 32 contains localized hot spots from the multi-element source 10, the image at plane 42 can also disturb the otherwise uniform intensity of the beam projected from rod 30 to the output plane 40. It is an objective of this invention to provide the beam with a substantially uniform intensity throughout the length of its projection from the lens 14 to the output plane 40.

In order to overcome this problem, means are provided in the optical system 46 of the present invention (FIG. 7) to move the image 42 of the faceted entrance face from the position shown in FIG. 6 to that shown in FIG. 7, i.e., from a location between lens 14 and output plane 40 to a position designated by the plane 48 in FIG. 7 which is located between the exit face 50 of the modified rod 52 and the lens 14. While this can be accomplished with separate optical elements, it is preferred that the image of the entrance face 54 is reformed by providing the rod exit face 50 with a spherical surface of a sufficient radius to focus the entrance face 54 at plane 48 which is located at the front focal length of lens 14. Rod 52 is otherwise similar to rod 30 in that it is made of an optically transmitting material such as quartz having polished sides. The faceted entrance face 54 is defined by four triangular surfaces which meet at an apex lying on the optical axis 12. By way of a specific example, rod 52 has a generally square cross section about 0.04 inch per side, a length of about 0.4 inch, with the angle of the facet faces with respect to the transverse axis being about 33 degrees. The radius of the exit face 50 is about 0.110 inch.

Thus, the exit face 50 serves as an integrally formed convex lens which provides the necessary imaging function while at the same time not disturbing the intensity distribution function of the rod 52 or creating distortions which might be added if external optical elements are employed. If the entrance face 54 is imaged upstream from the focal plane (f) of lens 14 then the entrance face 54 would be reimaged in front of the output plane 40 thereby causing some of the problems noted above in connection with FIG. 6. If the entrance face 54 is imaged in front of lens 14 but within its focal length (i.e., to the right of plane 48 shown in FIG. 7) then the entrance face would not be reimaged within the beam projection. However, some of the beam energy will be lost due to the diverging rays.

It should be understood that while this invention has been described in connection with a particular example thereof, that other modifications will become apparent to those skilled in the art upon a study of the specification, drawings and following claims.

What is claimed is:

1. Optical projection apparatus comprising:
 a multi-element source projecting a beam having a generally Gaussian intensity distribution along an optical axis towards an output plane;
 a rod of optically transmitting material disposed coaxially with the optical axis, the rod having an entrance face and an exit face;
 an objective lens disposed between the rod exit face and the output plane, said objective lens having a given focal length; and
 optical means for moving the image of the rod entrance face that would otherwise be created between the lens and the output plane to a position between the rod exit face and the lens;
 whereby the intensity of the beam projected along the optical axis from the exit face to the output plane has a generally uniform intensity throughout the length of the projected beam.

2. The apparatus of claim 1 wherein said optical means comprises a spherical surface on the exit face.

3. The apparatus of claim 2 wherein the spherical exit face surface is adapted to image the rod entrance face at substantially the front focal length of the lens.

4. The apparatus of claim 3 wherein the entrance face of the rod is faceted.

5. The apparatus of claim 4 wherein the entrance face is defined by four triangular-shaped surfaces meeting at an apex disposed substantially coaxially with the optical axis.

6. Optical projection apparatus for projecting a light beam of substantially uniform intensity along an optical axis towards an output plane, said apparatus comprising:
- a multi-element, nonplanar source of light projecting a beam along the optical axis towards the output plane;
- a rod of optically transmitting material having its length disposed coaxially with the beam projected from the source, said rod having a substantially rectangular cross section throughout its length between an entrance face and an exit face, said entrance and exit faces having different geometric configurations adapted to effectively invert the intensity of the beam entering the entrance face thereby producing a beam at the exit face in the form of a plane source of forwardly directed light;
- an objective lens disposed between the rod exit face and the output plane; and
- optical means formed in the rod for moving an image of the entrance face that otherwise would be created between the lens and the output plane to a position between the rod exit face and the lens;
- whereby the beam projected between the rod to the output plane has a substantially uniform intensity throughout its entire length.

7. The apparatus of claim 6 wherein the entrance face has faceted surfaces.

8. The apparatus of claim 6 wherein the optical means is a spherical surface integrally formed on the exit face of the rod.

9. The apparatus of claim 8 wherein the spherical surface is adapted to focus the image of the entrance face at substantially the front focal plane of the lens 10. The apparatus of claim 6 wherein said rod is constructed of a single piece of quartz material.

11. Optical projection apparatus comprising:
- a nonplanar laser diode array projecting a beam along an optical axis to an output plane;
- a quartz rod having a generally rectangular cross sectional area, a faceted entrance face and a spherical exit face;
- an objective lens disposed between the rod exit face and the output plane, said lens having a given focal length; and
- said rod exit face having a sufficient radius to image the rod entrance face at a location substantially coinciding with the front focal length of the objective lens;
- whereby the beam projected from the exit face of the rod to the output plane has a substantially uniform intensity distribution throughout its length.

* * * * *